Aug. 3, 1954 S. MEADOWCROFT ET AL 2,685,423
BOMB AND LIKE LOADING APPARATUS FOR AIRCRAFT
Filed Feb. 21, 1952 4 Sheets-Sheet 1
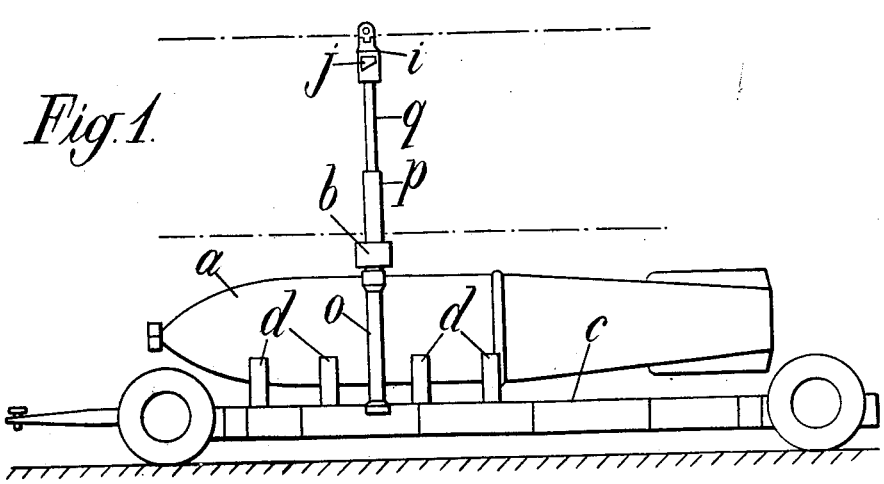
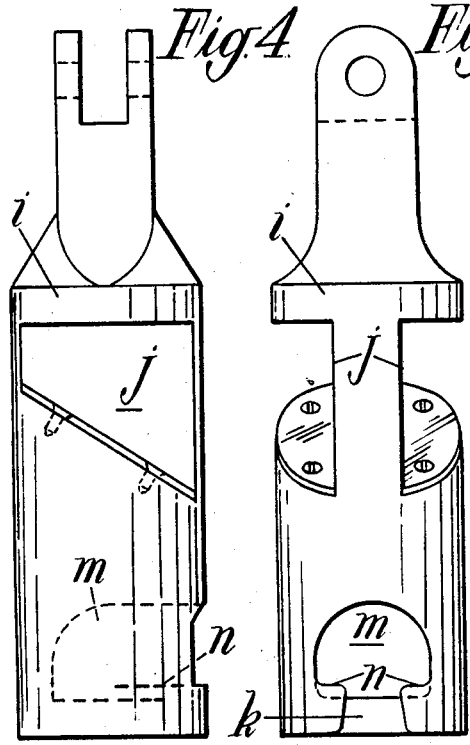
INVENTORS
Stanley Meadowcroft
Joseph Rimmington
BY Cameron, Kerkam & Sutton
ATTORNEYS

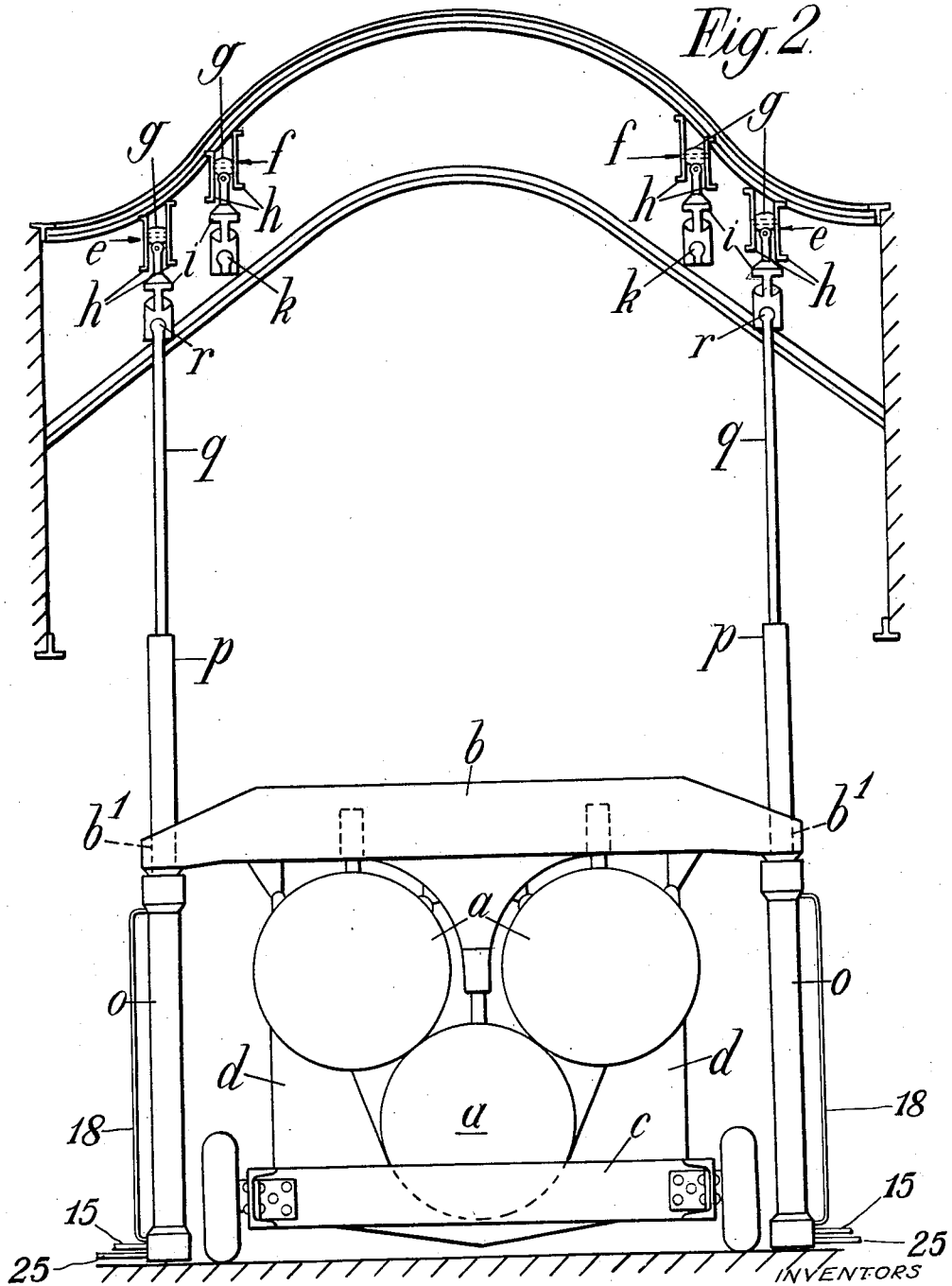

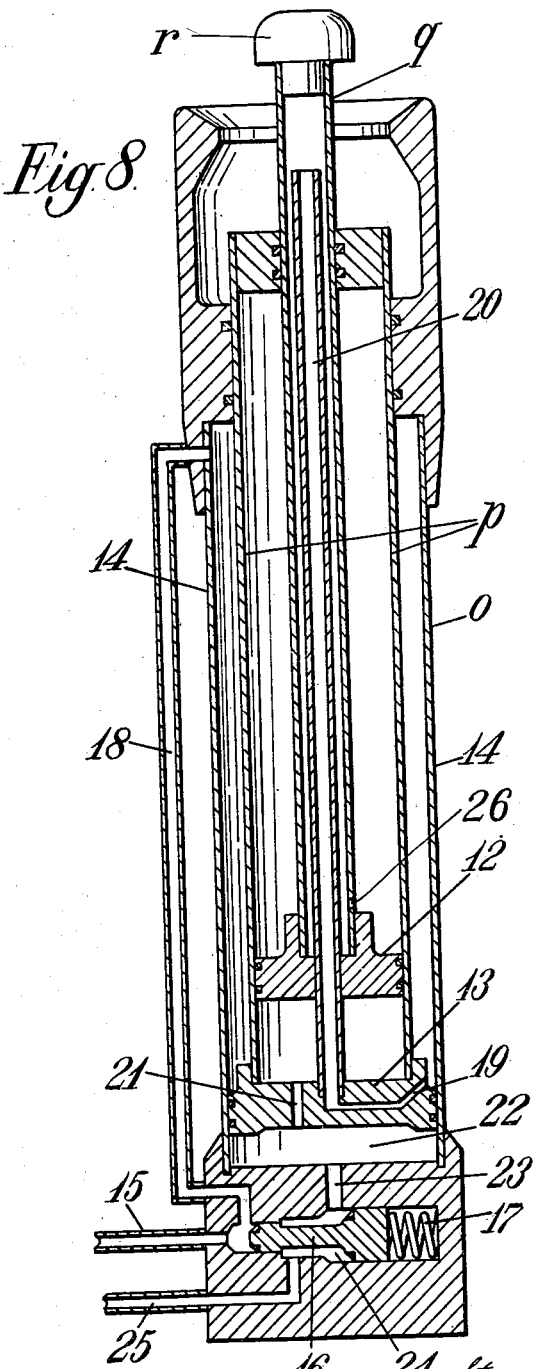

Patented Aug. 3, 1954

2,685,423

UNITED STATES PATENT OFFICE 2,685,423

BOMB AND LIKE LOADING APPARATUS FOR AIRCRAFT

Stanley Meadowcroft and Joseph Rimmington, Greengate, Middleton, Manchester, England, assignors to A. V. Roe & Company Limited, Manchester, England, a British company Application February 21, 1952, Serial No. 272,768

Claims priority, application Great Britain March 8, 1951

4 Claims. (Cl. 244—137)

This invention relates to apparatus for raising and loading bombs, torpedoes and the like (hereinafter termed bombs) into aircraft. With modern high speed aircraft there is not room for the installation of winches and like lifting gear which is operated and controlled by personnel in the aircraft.

The object of the present invention is to provide improved loading mechanism operable from below the aircraft, which accurately positions the bombs and secures them to the aircraft.

The invention consists in apparatus for loading bombs into aircraft comprising a bomb carrying frame from which the bomb or bombs is or are suspended, suspension fittings in the aircraft to which the frame is to be secured, double acting hydraulic jacks one for each end of the frame, each with a piston rod adapted to be passed under pressure through a hole in its end of the frame and extended so that it can be detachably anchored to a suspension fitting, control means causing hydraulic pressure to be exerted between the top of the cylinder of each jack and the piston in the cylinder when the piston rods are anchored to the fittings to cause the cylinders to rise and raise the frame till it is above the connection of the piston rods to the suspension fittings, and mechanism in the frame adapted to engage the suspension fittings for causing them to support the frame, the said mechanism being operable from ground level by a detachable extensible handle or other device.

The invention further comprises the aforesaid bomb loading apparatus in which the suspension fittings comprise a double pivot universal joint connection to the aircraft, with a slot in each fitting which extends part way across the base of the fitting and provides shoulders in a recess at opposite sides of the slot to support a head on the piston rod to be detachably secured to the fitting.

The invention further comprises the aforesaid bomb loading apparatus in which the bomb carrying frame incorporates two sliding fork shaped wedge members one at each end of the frame adapted to engage wedge shaped gaps in the sides of the suspension fittings when the frame is fully raised, and means in the frame for actuating said wedge members to cause them to engage the suspension fittings to transfer the weight of the frame and bomb or bombs to such fittings, and to disengage the frame from the fittings, the said actuating means being operable from ground level by a detachable extensible handle or other device.

Referring to the accompanying explanatory drawings:

Figure 1 is a diagrammatic view showing a bomb carrying trolley with our improved means for loading the bombs into an aircraft connected up ready for the loading operation.

Figure 2 is at right angles to Figure 1 but showing three bombs on a trolley about to be raised simultaneously into the bomb cell of an aircraft.

Figures 4 and 5 are views at right angles to one another of part of the bomb sustaining means shown in Figure 3.

Figures 6 and 7 are an elevation and a plan view respectively of the wedge member shown in Figure 3.

Figure 8 is a sectional elevation of one of the two-stage hydraulic jacks by which the bomb carrying frame is lifted.

Figure 3:
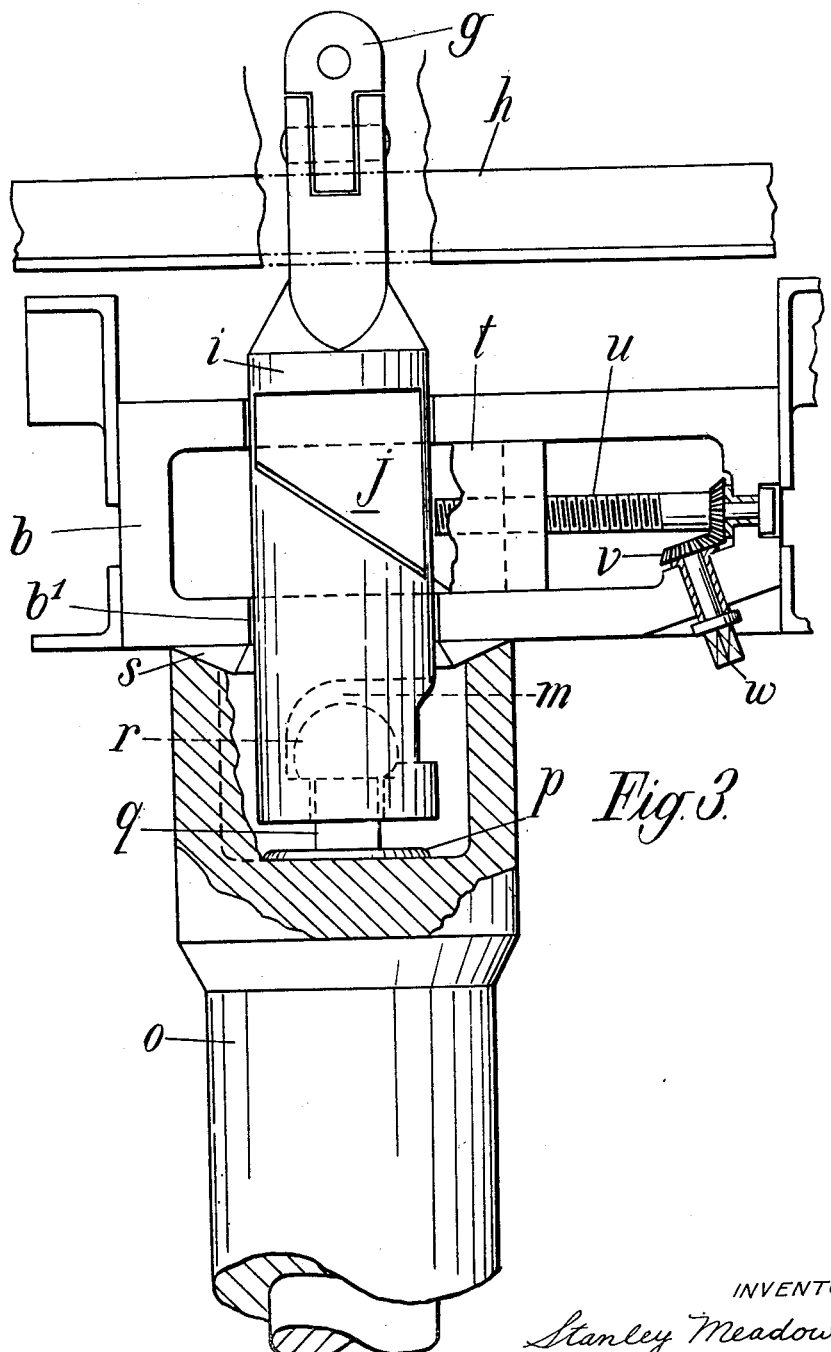
Figure 3 is a detail view drawn to a larger scale than Figures 1 and 2 showing the means for sustaining the bombs in the aircraft after the elevating or loading means have been withdrawn.

The bomb or bombs $a$ to be loaded into the bomb cell of an aircraft are attached to a carrier frame $b$ by usual quick release mechanism adapted to be operated by the pilot, bomb aimer or other person on the aircraft, and are wheeled into position beneath the aircraft on a trolley $c$ which may be moved by a suitable tractor.

There are suitable cradles $d$ on the trolley to support the bombs.

The carrier frame has a vertical hole $b^1$ therethrough at each of its two opposite ends.

Upon the aircraft above the bomb cell is a pair of bomb carrier anchoring and suspension units spaced apart a distance similar to the distance between the holes at the opposite ends of the carrier frame. In Figure 2, two pairs $e$ and $f$ of such units are shown to suit carrier frames of two different lengths. There may however be only one pair of such units or more than two pairs thereof to suit any particular requirements. Each unit comprises an upper link $g$ pivotally attached to fixed girder like members $h$ (see also Figure 3). Pivotally attached to member $g$ with its pivotal axis at right angles to the pivotal axis of $g$ is a fitting $i$ (see Figures 4 and 5) which has wedge shaped gaps $j$ in its opposite sides. There is also a slot $k$ in the fitting $i$ which extends part way across the base of the fitting and has an enlarged part $m$ which provides for two shoulders $n$, one at each side of the slot $k$. The double pivotal support of the fitting provides for a limited amount of universal movement of the fitting.

The carrier frame *b* is adapted to be connected to the anchoring and suspension units *e* or *f* by a pair of hydraulic jacks *o*. Each jack comprises a two stage hydraulic cylinder and in the construction illustrated, the two telescoping piston rods *p* and *q* are capable of being extended or retracted by hydraulic pressure and are shown extended in Figure 2. The end of each part *q* has a head *r* thereon which can be passed via the slot *k* into a fitting *i* where it is supported on the shoulders *n*. Preferably, as shown in Figures 3, 4 and 5, there is a recessed part of the shoulders *n* in which the head *r* seats when correctly located in the fitting *i*.

Each two-stage hydraulic jack *o* comprises, as shown in Figure 8, two telescoping tubular piston rods *p* and *q*. The piston 12 secured to the rod *q* moves in the tubular piston rod *p* and the piston 13 secured to the rod *p* moves in the cylinder 14. In Figure 8, if hydraulic pressure is applied to the pipe 15, such pressure moves the valve 16 to the position shown against the pressure of the spring 17. The hydraulic pressure passes by way of the pipe 18 to the top of the cylinder 14 and forces the piston 13 downwards. Such pressure also passes from the cylinder 14 by the passage 19 in the piston 13 and the tube 20 secured to such piston to the annular space between the tube 20 and the piston rod *q* and so via holes 26 in such rod to above the piston 12, so that both pistons 12 and 13 are forced downwards. The exhaust from below the piston 12 passes via the passage 21 in the piston 13 to the space 22 below the piston 13 and thence via the passage 23 and the space 24 in the valve housing to the pipe 25 which becomes the exhaust branch. If, however, pressure be applied to the pipe 25 and the pipe 15 becomes the exhaust pipe, the valve 16 still assumes the position shown and pressure passes by the passage 22 to the underside of the piston 13 and via the passage 21 to the underside of the piston 12 so that both pistons become fully raised. The pipes and passages which previously supplied pressure fluid to the upper sides of the two pistons now become exhaust pipes and passages.

When pressure is removed from pipes 15 and 25, the spring 17 moves the valve 16 to close pipe 18 and passage 23.

When the bomb trolley is in position, a jack is brought into place below one end of the carrier frame *b* and the jack piston rod raised by hydraulic pressure applied to the bottom of the jack cylinder until its head *r*, after going through the hole *b¹* in that end of the frame *b*, can be passed into the fitting *i* and located as shown in Figure 3. The other jack is similarly attached to the other fitting *i* of the pair which is to support the bomb carrier frame *b* after its piston rod has been passed through the hole near the other end of the carrier frame. Hydraulic pressure is now applied to the upper ends of the cylinders of the jacks above the pistons in such cylinders. As the piston rods are anchored to the fittings *i*, the hydraulic pressure causes the jack cylinder to rise, engage the underside of the frame *b* and raise it with it. The lower end of each jack cylinder is of course now open to exhaust. When the jack cylinders are fully raised, the ends of the frame *b* are above the slotted lower portions of the fittings *i* as shown in Figure 3. The bottom of the frame *b* around the hole *b¹* therethrough has a spherical annular surface at *s* to mate with a similar shaped recess in the head of the jack cylinder (see Figure 3) in order to permit the jack to move angularly relatively to the frame *b* without interfering with the accurate location of the frame upon the aircraft.

The bomb carrier frame *b* has two sliding wedge units *t* incorporated therein (one at each end of the frame) the wedge being of fork shape in plan (see Figure 7) and being adapted to pass into and along the wedge shaped gaps *j* in the opposite sides of the member *i* which comes into the frame when it is fully raised. Each wedge is moved by a screw *u* carried in the frame *b* which threads into the wedge, the screw being rotated by bevel pinions *v* operable from ground level by an extensible handle or other device removably attached to the spindle *w*. When the two wedges of a frame *b* have been moved into position so that the bomb load is carried by the fitting *i* through the wedges and frame *b*, the cylinders of the hydraulic jacks can be lowered and the heads *r* of the piston rods *q* detached from the fittings *i*.

If required hydraulic jacks each with a single extension piston rod may be employed instead of the double extension telescopic piston rods described.

With our improvement, the bombs after being secured upon the carrier frame *b* can be readily moved by trolley to a position beneath the aircraft and have the hydraulic jack piston rods passed therethrough and their heads *r* anchored to the suspension fittings on the aircraft. The operation of the jacks hoists the carrier frame *b* into position on the aircraft and the actuation of the wedge units *t* locks the carrier frame to the suspension fittings *i* and enables the jacks to be withdrawn.

What we claim is:

1. Apparatus for loading bombs into aircraft comprising a bomb carrying frame having a vertical hole in each end thereof, suspension fittings in the aircraft to which the frame is adapted to be secured, double acting hydraulic jacks one for each end of the frame, each of said jacks having a cylinder adapted to engage and support one end of said frame, a piston in said cylinder and a piston rod adapted to be extended upwardly through the hole in the associated end of the frame, means for detachably connecting the upper end of each of said piston rods to one of said suspension fittings, means for exerting hydraulic pressure between the top of the cylinder of each jack and the piston in said cylinder when the piston rods are connected to the fittings to raise the cylinders relative to the pistons and thereby raise the ends of the frame supported by said cylinders until said frame is above the connections of the piston rods to the suspension fittings, and mechanism carried by the frame and operable from ground level for engaging the suspension fittings and supporting the frame therefrom.

2. Apparatus as claimed in claim 1, wherein each of the suspension fittings comprises a double pivot universal joint connection to the aircraft and a slot extending part way across the base of said fitting, the upper portion of said slot being enlarged to provide shoulders on opposite sides of the slot, and wherein each of said hydraulic jack piston rods includes a head on the upper end thereof adapted to enter the slot of one of said fittings and to be supported on the shoulders provided thereby.

3. Apparatus as claimed in claim 1, wherein the engaging surfaces of the hydraulic jack cylinders and the frame have part spherical shapes to allow the jacks to move angularly relatively to the bomb carrier frame without interfering with the accurate location of the frame relative to the aircraft.

4. Apparatus for loading bombs into aircraft comprising a bomb carrying frame having a vertical hole in each end thereof, suspension fittings in the aircraft to which the frame is adapted to be secured, double acting hydraulic jacks one for each end of the frame, each of said jacks having a cylinder adapted to engage and support one end of said frame, a piston in said cylinder and a piston rod adapted to be extended upwardly through the hole in the associated end of the frame, means for detachably connecting the upper end of each of said piston rods to one of said suspension fittings, means for exerting hydraulic pressure between the top of the cylinder of each jack and the piston in said cylinder when the piston rods are connected to the fittings to raise the cylinders relative to the pistons and thereby raise the ends of the frame supported by said cylinders until said frame is above the connections of the piston rods to the suspension fittings, wedge shaped gaps in the sides of said suspension fittings, two fork shaped wedge members slidably mounted in said frame at the opposite ends thereof and adapted to engage said wedge shaped gaps in the suspension fittings when the frame has been raised, and means carried by the frame and operable from ground level for actuating said wedge members to move the latter into and out of the gaps in said fittings and thereby transfer the weight of the frame and the bombs carried thereby to and from said fittings.

References Cited in the file of this patent

UNITED STATES PATENTS

| Number | Name | Date |
|---|---|---|
| 1,270,231 | Stauft | June 18, 1918 |
| 2,136,255 | Scanlon | Nov. 8, 1938 |
| 2,448,862 | Conklin | Sept. 7, 1948 |
| 2,514,045 | Gardenhire | July 4, 1950 |
| 2,520,317 | Laddon et al. | Aug. 29, 1950 |
| 2,540,378 | Restefsky | Feb. 6, 1951 |

OTHER REFERENCES

Ser. No. 340,618, Magni (A. P. C.), published May 4, 1943.